(12) United States Patent
Horng et al.

(10) Patent No.: US 6,573,633 B2
(45) Date of Patent: Jun. 3, 2003

(54) STATOR ASSEMBLIES FOR MOTORS

(75) Inventors: Alex Horng, Kaohsiung (TW);
Ching-Shen Hong, Kaohsiung (TW);
Yin Tso-Kuo, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 10/197,838

(22) Filed: Jul. 19, 2002

(65) Prior Publication Data

US 2002/0190601 A1 Dec. 19, 2002

Related U.S. Application Data

(62) Division of application No. 09/880,803, filed on Jun. 15, 2001, now Pat. No. 6,441,531.

(51) Int. Cl.[7] .................................................. H02K 3/00
(52) U.S. Cl. ...................................... 310/216; 310/218
(58) Field of Search ................................ 310/216–218, 310/254–258, 42; 29/591–598

(56) References Cited

U.S. PATENT DOCUMENTS

| | | | | |
|---|---|---|---|---|
| 3,842,300 A | * | 10/1974 | Daykin et al. | 310/216 |
| 3,914,859 A | * | 10/1975 | Pierson | 310/218 |
| 4,554,491 A | * | 11/1985 | Plunkett | 310/62 |
| 6,239,532 B1 | * | 5/2001 | Hollenbeck et al. | 310/257 |

* cited by examiner

*Primary Examiner*—Tran Nguyen
(74) *Attorney, Agent, or Firm*—Bacon & Thomas

(57) ABSTRACT

A stator assembly comprises upper and lower pole plates or silicon steel sheets each having a plurality of radial poles. Each radial pole includes a magnetic pole face extending along a direction parallel to a longitudinal direction. The magnetic pole faces of each upper pole plate, each lower pole plate, or each silicon steel sheet may be of the same or different length. Alternatively, the magnetic pole faces may be overlapped with each other or not overlapped with each other. The overall magnetic pole face formed by the magnetic pole faces may be so arranged to represent a step-like structure or an inclined side.

7 Claims, 8 Drawing Sheets

STATOR ASSEMBLIES FOR MOTORS

This application is a division of application Ser. No 09/880,803 filed Jun. 15, 2001, now U.S. Pat. No. 6,441,531.

BACKGROUND OF THE INVENTION

1. Field of the Invention

The present invention relates to stator assemblies for motors, and more particularly to stator assemblies having improved magnetic conduction effect, thereby avoiding dead corner of rotation and increasing the rotating torque.

2. Description of the Related Art

FIGS. 11 and 12 of the drawings illustrate a conventional stator comprising an axle tube 91 having an upper pole plate 92, a bobbin 93, and a lower pole plate 94 mounted therearound. Walls 95 project outward from a portion of a periphery of the upper pole plate 92 and extend along a direction parallel to a longitudinal direction of the upper pole plate 92. Similarly, walls 96 project outward from a portion of a periphery of the lower pole plate 94 and extend along a longitudinal direction of the lower pole plate 94. Thus, the walls 95 and 96 provide a larger magnetically conductive area with a permanent ring magnet on a rotor. However, the sectional thickness of each of the upper and lower pole plates 92 and 94 is not increased although the induction area is increased, as the upper pole plate 92 and the lower pole plate 94 are formed by means bending silicon steel sheets of identical thickness. As a result, the magnetic conduction effect is poor, the rotational torque is insufficient, the rotation is unstable, and floating rotation may occur.

SUMMARY OF THE INVENTION

It is the primary object of the present invention to provide a stator assembly that has improved magnetic conduction effect to thereby increase the rotational torque.

It is another object of the present invention to provide a stator assembly without dead corner of rotation, thereby allowing easy starting of the rotor.

A stator assembly in accordance with the present invention comprises upper and lower pole plates or silicon steel sheets each having a plurality of radial poles. Each radial pole includes a magnetic pole face extending along a direction parallel to a longitudinal direction. The magnetic pole faces of each upper pole plate, each lower pole plate, or each silicon steel sheet may be of the same or different length. Alternatively, the magnetic pole faces may be overlapped with each other or not overlapped with each other. The overall magnetic pole face formed by the magnetic pole faces may be so arranged to represent a step-like structure or an inclined side.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENTS

Preferred embodiments in accordance with the present invention will now be described with reference to the accompanying drawings.

Figure 1:
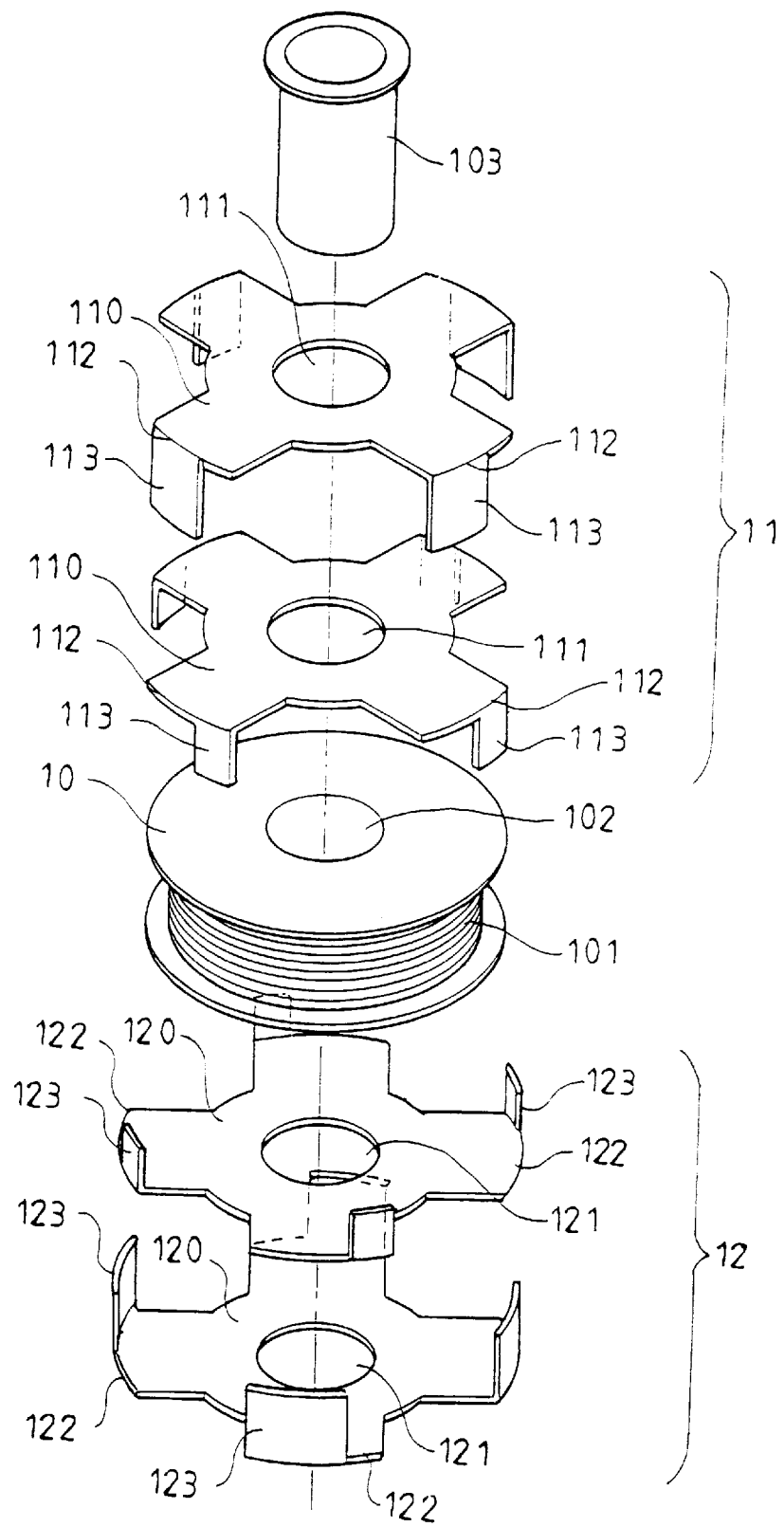
FIG. 1 is an exploded perspective view of a first embodiment of a stator assembly in accordance with the present invention.
Figure 2:
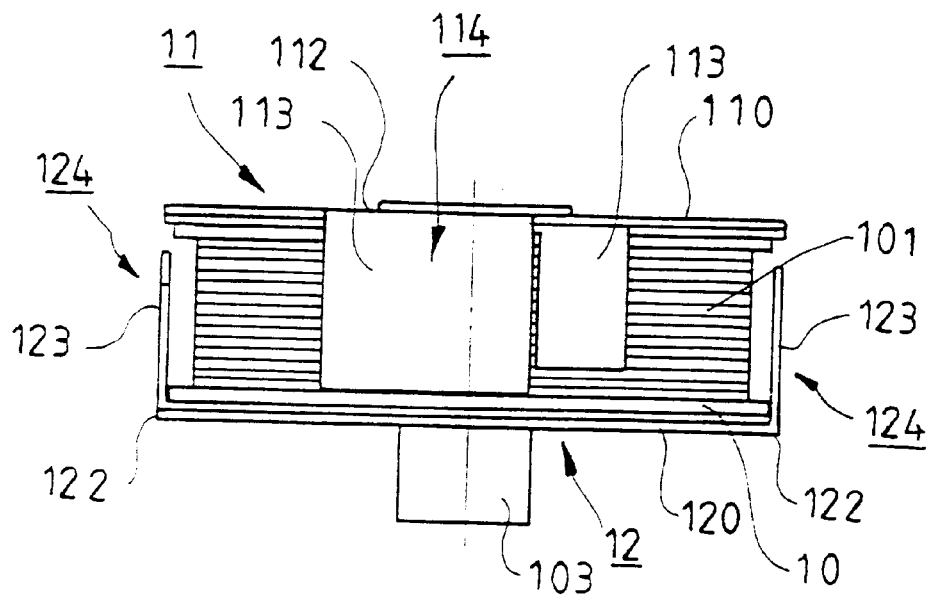
FIG. 2 is a longitudinal sectional view of the positioning stator in FIG. 1.

Referring to FIGS. 1 and 2, a first embodiment of a stator assembly in accordance with the present invention generally includes a bobbin 10, an upper pole plate assembly 11, and a lower pole plate assembly 12.

The bobbin 10 may be any conventional bobbin for all kinds of D.C. (direct current) brushless motors and heat-dissipating fans. The bobbin 10 includes an axial winding 101 wound therearound and a central hole 102 through which an axle tube 103 extends for mounting the upper and lower pole plate assemblies 11 and 12.

The upper pole plate assembly 11 comprises at least two upper pole plates 110 that are stacked each other. Each upper pole plate 110 includes a hole 111 through which the axle tube 103 extends. The upper pole plates 110 are thus mounted to a side of the bobbin 10. Each upper pole plate 110 further includes a plurality of radial poles 112. Each radial pole 112 has a magnetic pole face 113 extending along a direction parallel to a longitudinal direction of the upper pole plate 110. The width of the magnetic pole face 113 is smaller than that of the radial pole 112. The magnetic pole faces 113 on the aligned radial poles 112 are of different lengths and not overlapped with each other, as shown in FIG. 2. And the overall upper magnetic pole face 114 of the upper pole plate assembly 11 has a stepped-like bottom, best shown in FIG. 2.

Similarly, the lower pole plate assembly 12 comprises at least two lower pole plates 120 that are stacked each other. Each lower pole plate 120 includes a hole 121 through which the axle tube 103 extends. The lower pole plates 120 are thus mounted to the other side of the bobbin 10. Each lower pole plate 120 further includes a plurality of radial poles 122. Each radial pole 122 has a magnetic pole face 123 extending along a direction parallel to a longitudinal direction of the lower pole plate 120. The width of the magnetic pole face 123 is smaller than that of the radial pole 122. The magnetic pole faces 123 on the aligned radial poles are of different lengths and not overlapped with each other. And the overall lower magnetic pole face 124 of the lower pole plate assembly 12 has a stepped-like upper side.

Referring to FIG. 2, in assembly, the upper pole plate assembly 11 and the lower pole plate assembly 12 are respectively mounted to upper and lower sides of the bobbin 10 by the axle tube 103 that extends through the central hole 102 of the bobbin 10. The axle tube 103 and the upper and lower pole plate assemblies 11 and 12 form a path of magnetic conduction. Since each of the upper pole plate assembly 11 and the lower pole plate assembly 12 comprises a plurality of stacked pole plates, a larger flux is obtained between the upper and lower pole plate assemblies II and 12 and the axle tube 103. The upper and lower pole plate assemblies 11 and 12 and the permanent magnet of the rotor have a larger induction area such that the rotor has a larger rotational torque. In addition, since the bottom of the overall upper magnetic pole face 114 and the upper side of the overall lower magnetic pole face 124 are step-like as a result of different lengths in the magnetic pole faces 113 and 123, the overall upper pole face 114 of the upper pole plate assembly 11 and the overall lower pole face 124 of the lower pole plate assembly 12 form unequal flux and thus have uneven induction with the permanent magnet of the rotor. Thus, the rotor has no dead corner of rotation, and the rotor can be started to turn easily when the permanent ring magnet of the rotor has an induction with the upper and lower pole plate assemblies 11 and 12.

Figure 3:
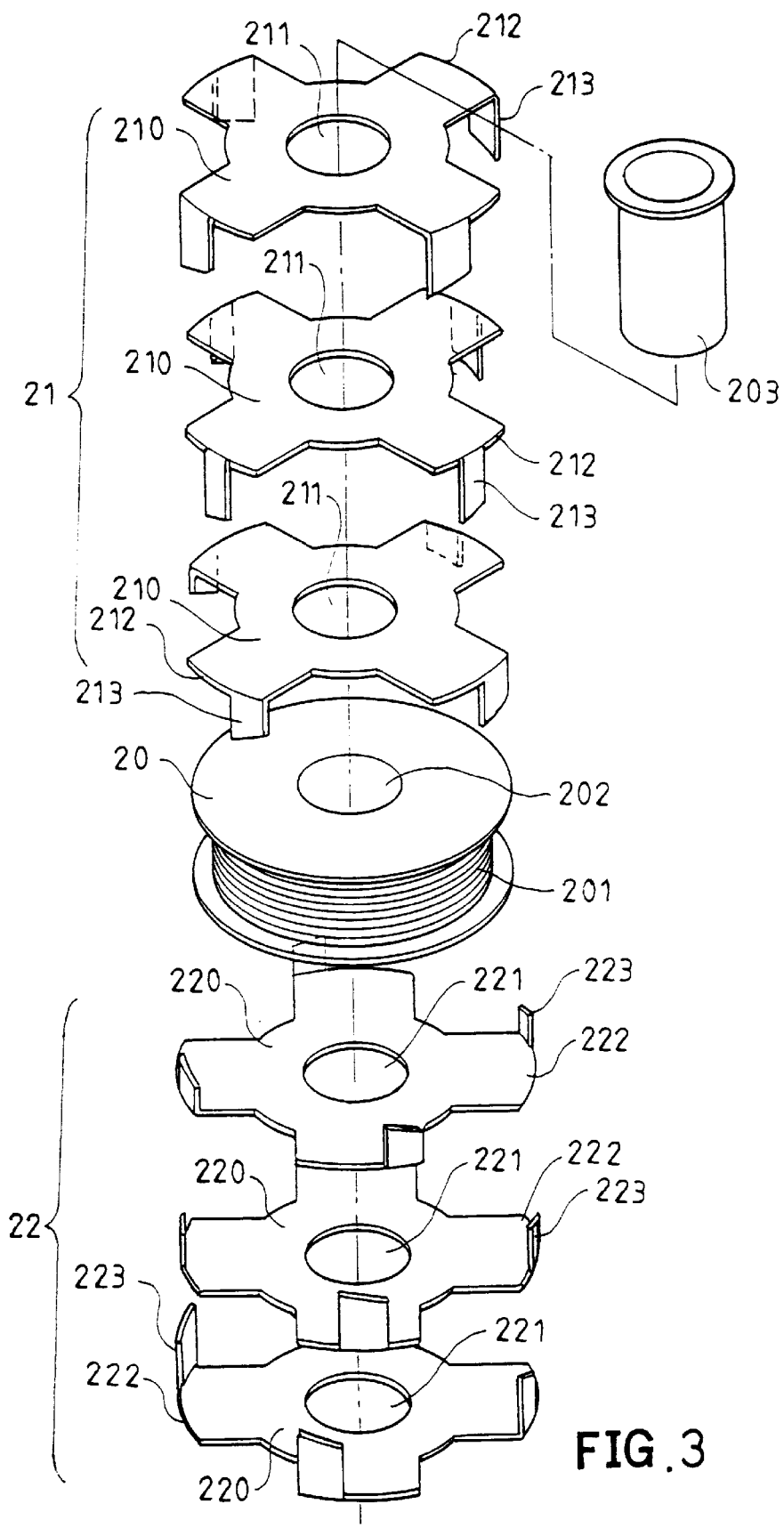
FIG. 3 is an exploded perspective view of a second embodiment of the stator assembly in accordance with the present invention.

FIG. 3 illustrates a second embodiment of the stator assembly in accordance with the present invention, wherein the stator assembly includes a bobbin 20, an upper pole plate assembly 21, and a lower pole plate assembly 22.

The bobbin 20 may be any conventional bobbin for all kinds of D.C. (direct current) brushless motors and heat-dissipating fans. The bobbin 20 includes a winding 201 wound therearound and a central hole 202 through which an axle tube 203 extends for mounting the upper and lower pole plate assemblies 21 and 22.

Figure 4:
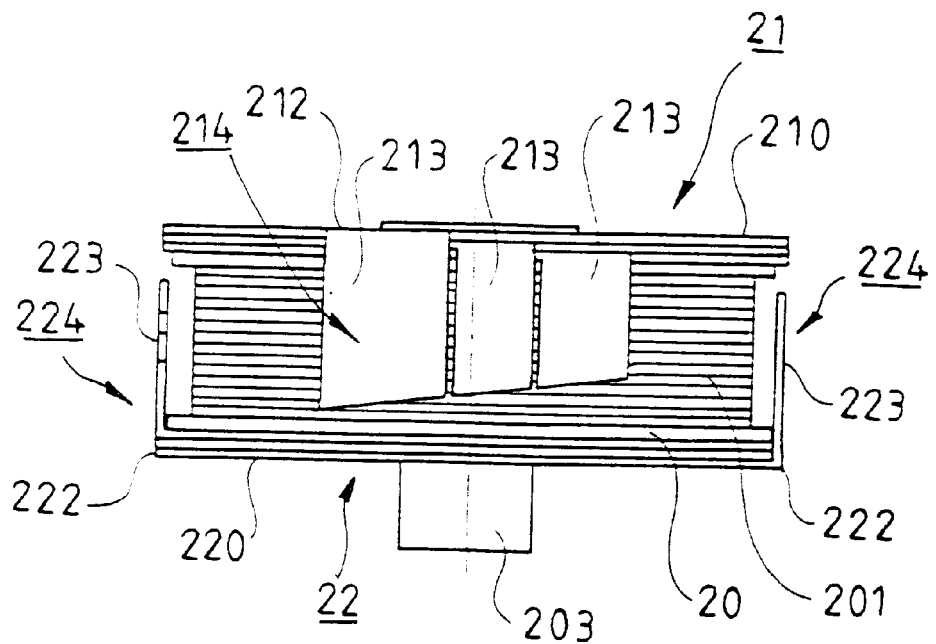
FIG. 4 is a longitudinal sectional view of the positioning stator in FIG. 3.

In this embodiment, the upper pole plate assembly 21 comprises three upper pole plates 110 that are stacked one another. Each upper pole plate 210 includes a hole 211 through which the axle tube 203 extends. The upper pole plates 210 are thus mounted to a side of the bobbin 20. Each upper pole plate 210 further includes a plurality of radial poles 212. Each radial pole 212 has a magnetic pole face 213 extending along a direction parallel to a longitudinal direction of the upper pole plate 210. The width of the magnetic pole face 213 is smaller than that of the radial pole 212. The magnetic pole faces 213 on the aligned radial poles 212 are located side by side (i.e., not overlapped with one another), as shown in FIG. 4. The bottom of each magnetic pole face 213 on the upper pole plates 210 is inclined. The bottoms of the magnetic pole faces 213 on the aligned radial poles 212 may be so arranged that the overall upper magnetic pole face 214 of the upper pole assembly 21 has an inclined bottom, best shown in FIG. 4. Namely, the lengths of the magnetic pole faces 213 increase or decrease gradually.

Similarly, the lower pole plate assembly 22 comprises three lower pole plates 210 that are stacked one another. Each lower pole plate 220 includes a hole 221 through which the axle tube 203 extends. The lower pole plates 210 are thus mounted to the other side of the bobbin 20. Each lower pole plate 220 further includes a plurality of radial poles 222. Each radial pole 222 has a magnetic pole face 223 extending along a direction parallel to a longitudinal direction of the lower pole plate 220. The width of the magnetic pole face 223 is smaller than that of the radial pole 222. The magnetic pole faces 223 on the aligned radial poles 222 are located side by side (i.e., not overlapped with one another). The upper side of each magnetic pole face 223 on the lower pole plates 220 is inclined. The upper sides of the magnetic pole faces 223 on the aligned radial poles 222 may be so arranged that the overall lower magnetic pole face 224 of the upper pole assembly 22 has an inclined upper side (see FIG. 4). Namely, the lengths of the magnetic pole faces 223 increase or decrease gradually.

Referring to FIG. 4, in assembly, the upper pole plate assembly 21 and the lower pole plate assembly 22 are respectively mounted to upper and lower sides of the bobbin 20 by the axle tube 203 that extends through the central hole 202 of the bobbin 20. The axle tube 203 and the upper and lower pole plate assemblies 21 and 22 form a path of magnetic conduction. Since each of the upper pole plate assembly 21 and the lower pole plate assembly 22 comprises a plurality of stacked pole plates 210, 220, a larger flux is obtained between the upper and lower pole assemblies 21 and 22 and the axle tube 203. The upper and lower pole plate assemblies 21 and 22 and the permanent magnet of the rotor have a larger induction area such that the rotor has a larger rotational torque. In addition, since the bottoms of the overall upper magnetic pole faces 214 and the upper sides of the overall lower magnetic pole faces 224 are inclined, the overall upper pole faces 214 of the upper pole plate assembly 21 and the lower pole faces 224 of the overall lower pole plate assembly 22 form unequal flux and thus have uneven induction with the permanent magnet of the rotor. Thus, the rotor has no dead corner of rotation, and the rotor can be started to turn easily when the permanent ring magnet of the rotor has an induction with the upper and lower pole plate assemblies 21 and 22.

Figure 5:
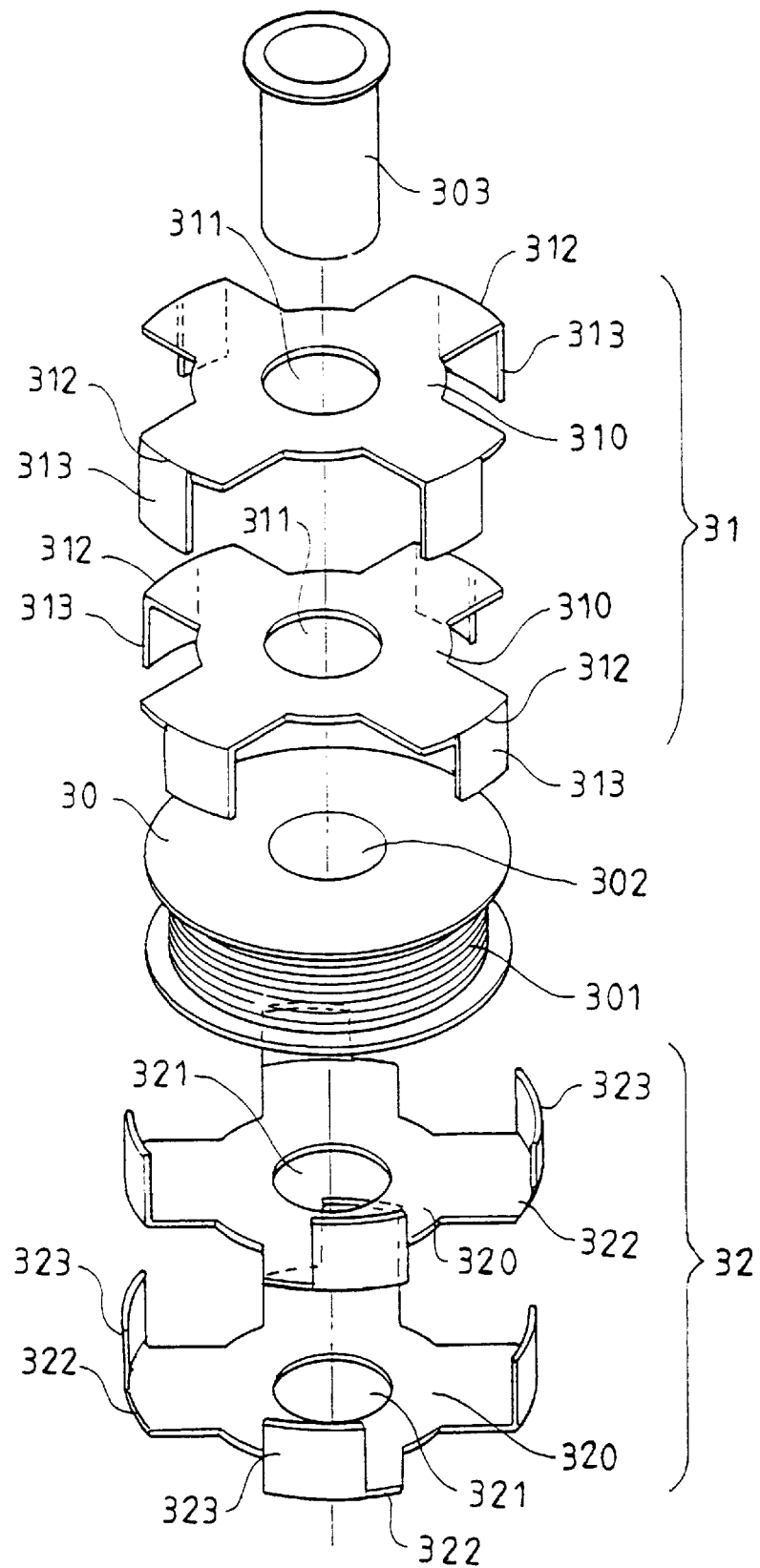
FIG. 5 is an exploded perspective view of a third embodiment of the stator assembly in accordance with the present invention.

FIG. 5 illustrates a third embodiment of the stator assembly in accordance with the present invention, wherein the stator assembly includes a bobbin 30, an upper pole plate assembly 31, and a lower pole plate assembly 32.

The bobbin 30 may be any conventional bobbin for all kinds of D.C. (direct current) brushless motors and heat-dissipating fans. The bobbin 30 includes an axial winding 301 wound therearound and a central hole 302 through which an axle tube 303 extends for mounting the upper and lower pole plate assemblies 31 and 32.

Figure 6:
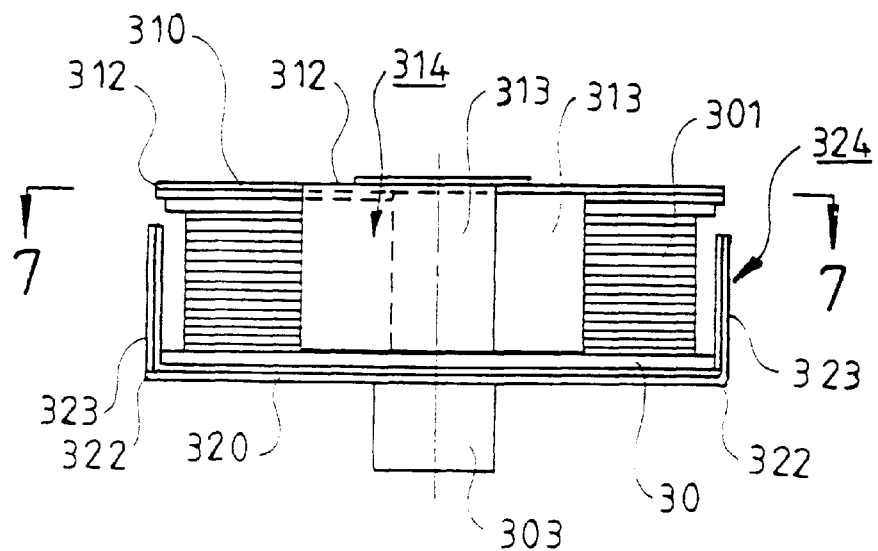
FIG. 6 is a longitudinal sectional view of the stator assembly in FIG. 5.

The upper pole plate assembly 31 comprises at least two upper pole plates 310 that are stacked each other. Each upper pole plate 310 includes a hole 311 through which the axle tube 303 extends. The upper pole plates 310 are thus mounted to a side of the bobbin 30. Each upper pole plate 310 further includes a plurality of radial poles 312. Each radial pole 312 has a magnetic pole face 313 extending along a direction parallel to a longitudinal direction of the upper pole plate 310. The width of the magnetic pole face 313 is smaller than that of the radial pole 312. The magnetic pole faces 313 on the aligned radial poles 312 are overlapped with each other, as shown in FIG. 6. The magnetic pole faces 313 of the aligned radial poles 312 of the upper pole plates 310 may be of the same or different length or have an inclined bottom. The bottoms of the magnetic pole faces 313 of the aligned radial poles 312 may be so arranged to form a step-like or inclined bottom for the overall upper magnetic pole face 314. Alternatively, the surface of the overall upper magnetic pole face 314 may be step-like.

Similarly, the lower pole plate assembly 31 comprises at least two lower pole plates 320 that are stacked each other. Each lower pole plate 320 includes a hole 321 through which the axle tube 303 extends. The lower pole plates 320 are thus mounted to the other side of the bobbin 30. Each lower pole plate 310 further includes a plurality of radial poles 322. Each radial pole 322 has a magnetic pole face 323 extending along a direction parallel to a longitudinal direction of the lower pole plate 310. The width of the magnetic pole face 323 is smaller than that of the radial pole 322. The magnetic pole faces 323 on the aligned radial poles 322 are overlapped with each other. The magnetic pole faces 323 of the aligned radial poles 322 of the lower pole plates 320 may be of the same or different length or have an inclined upper side. The upper sides of the magnetic pole faces 323 may be so arranged to form a step-like or inclined upper side for the overall upper magnetic pole face 324. Alternatively, the surface of the overall upper magnetic pole face 324 may be step-like.

Figure 7:
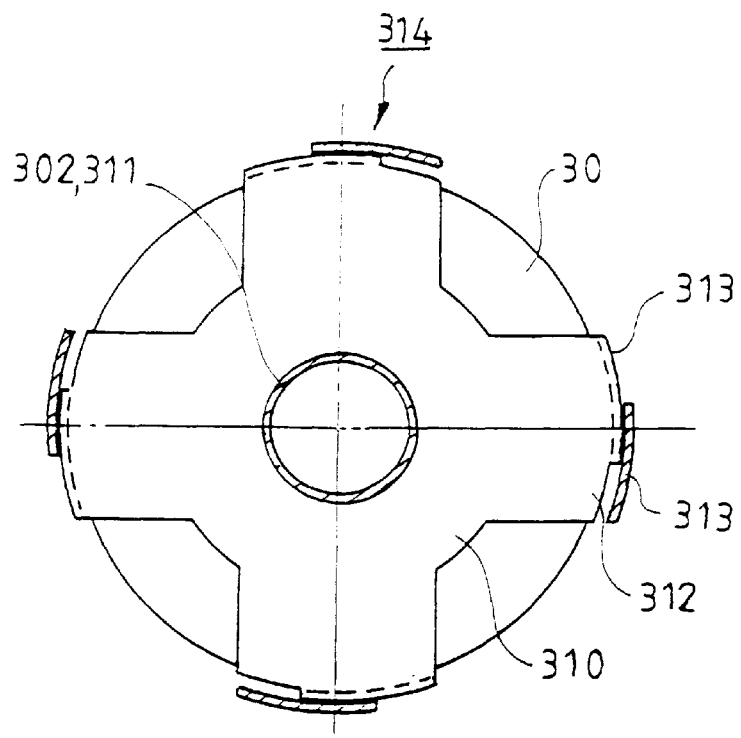
FIG. 7 is a sectional view taken along line 7—7 in FIG. 6.

Referring to FIGS. 6 and 7, in assembly, the upper pole plate assembly 31 and the lower pole plate assembly 32 are respectively mounted to upper and lower sides of the bobbin 30 by means of the axle tube 303 that extends through the central hole 302 of the bobbin 30. The axle tube 303 and the upper and lower pole plate assemblies 31 and 32 form a path of magnetic conduction. Since each of the upper pole plate assembly 31 and the lower pole plate assembly 32 comprises a plurality of stacked pole plates 310, 320, a larger flux is obtained between the upper and lower pole plate assemblies 31 and 32 and the axle tube 303. The upper and lower pole plate assemblies 31 and 32 and the permanent magnet of the rotor have a larger induction area such that the rotor has a larger rotational torque. In addition, since the magnetic pole faces 313, 323 are overlapped with each other or the magnetic pole faces 313 and 323 of the upper and lower pole plates 310 and 320 are of the same or different length or have an inclined bottom or upper side, the upper pole face 314 of the upper pole plate assembly 31 and the lower pole face 324 of the lower pole plate assembly 32 form unequal flux and thus have uneven induction with the permanent magnet of the rotor. Thus, the rotor has no dead corner of rotation, and the rotor can be started to turn easily when the permanent ring magnet of the rotor has an induction with the upper and lower pole plate assemblies 31 and 32.

Figure 8:
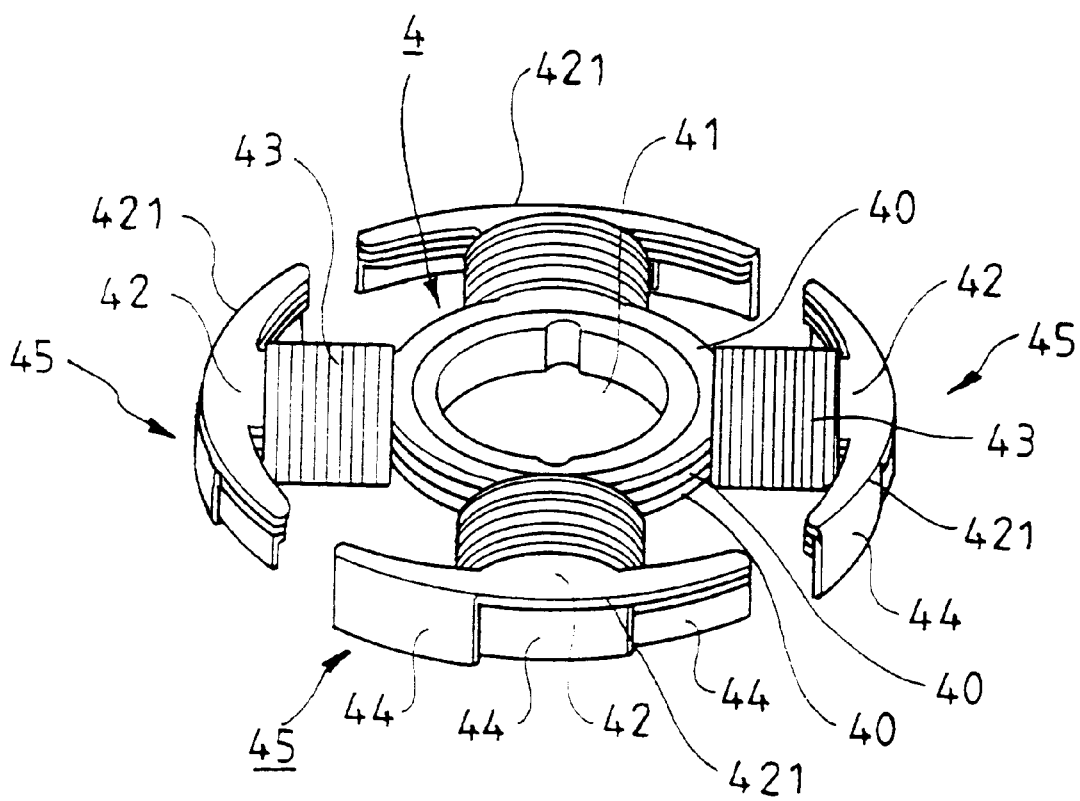
FIG. 8 is a perspective view of a fourth embodiment of the stator assembly in accordance with the present invention.

FIG. 8 illustrates a fourth embodiment of the stator assembly in accordance with the present invention of a radial winding type. The stator assembly 4 comprises a plurality of stacked silicon steel sheet 40 having a common central hole 41 through which an axle tube (not shown) extends. A shaft (not shown) of a rotor (not shown) is rotatably received in the axle tube. Each silicon steel sheet 40 includes a plurality of radial poles 42 each having a winding 43 wound therearound. A plurality of magnetic pole faces 44 project from a distal end 421 of each pole 42 and extend along a direction parallel to a longitudinal direction of the central hole 41. Each magnetic pole face 44 has a width smaller that that of the distal end 421 of the respective radial pole 42. In addition, the magnetic pole faces 44 on each radial pole 42 may be overlapped or not overlapped with one another. The magnetic pole faces 44 on each radial pole 42 may have be of the same or different length (see FIG. 9). Of course, the magnetic pole faces 44 on each radial pole 42 may be arranged to represent an inclined side.

Figure 9:
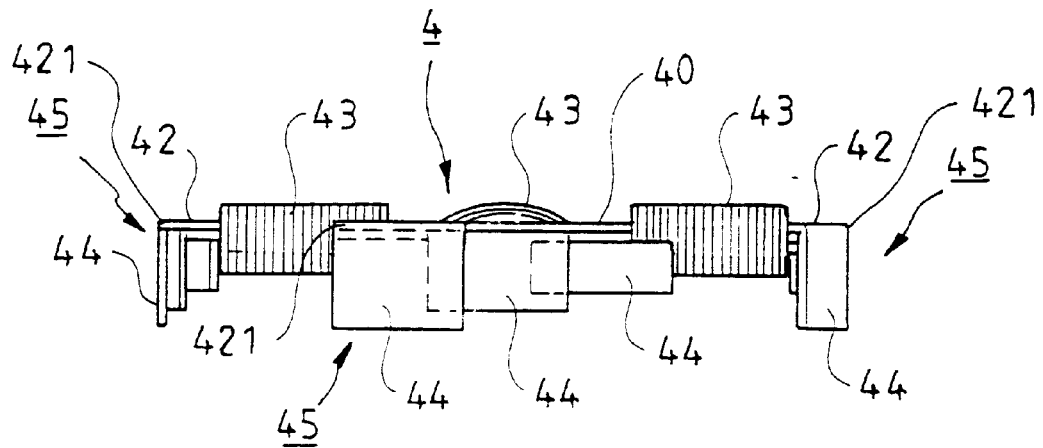
FIG. 9 is a side view of the stator in FIG. 8.
Figure 10:
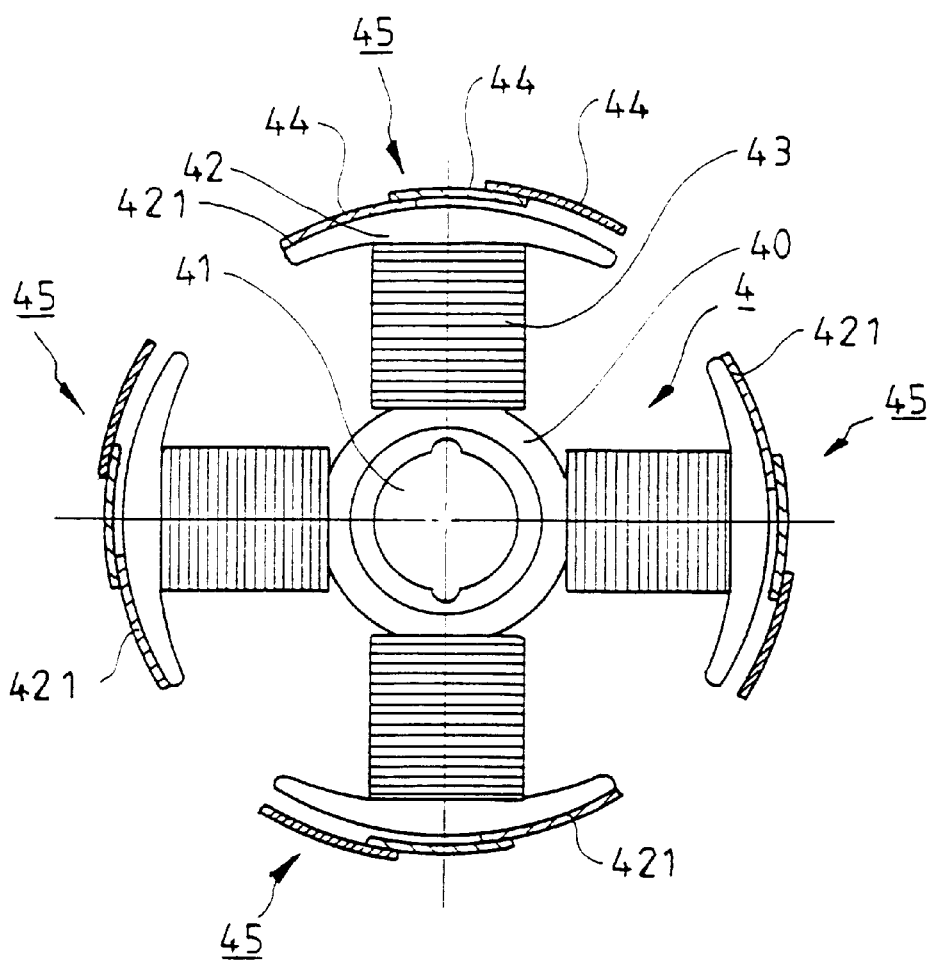
FIG. 10 is a top view of the stator in FIG. 8.
Figure 11:
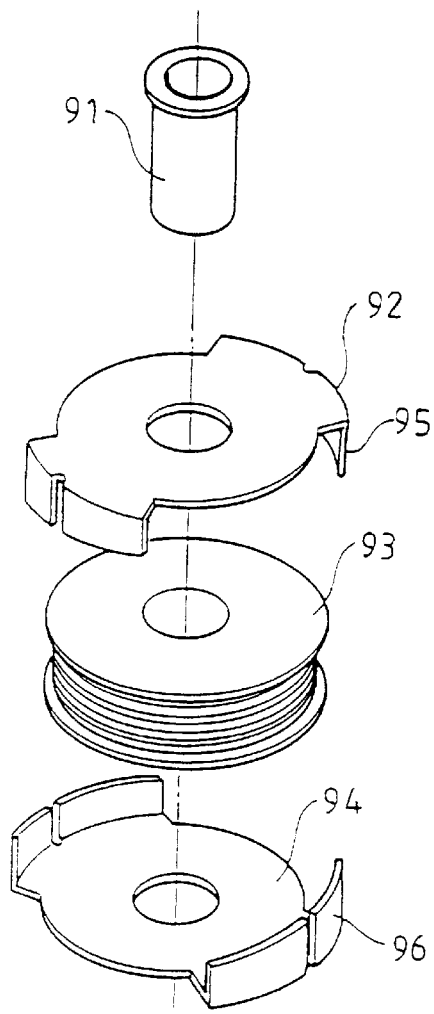
FIG. 11 is an exploded perspective view of a conventional stator.
Figure 12:
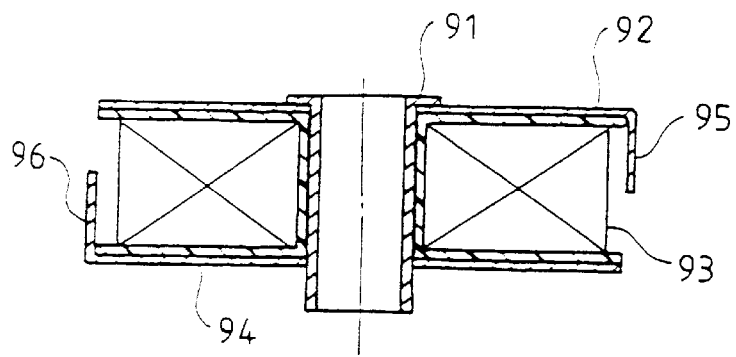
FIG. 12 is a sectional view of the conventional stator in FIG. 11.

As illustrated in FIGS. 9 and 10, in this embodiment where the stator assembly 4 consists of a plurality of stacked silicon steel sheets 40, the overall area of the magnetic pole faces 45 may remain unchanged or even increased even if the number of the silicon steel sheets 40 is reduced. Thus, the stator assembly 4 and the permanent magnet of the rotor have a larger induction area therebetween, thereby providing the rotor with a larger rotational torque. In addition, since the magnetic pole faces 44 of each silicon steel sheet 40 can be arranged to be overlapped with one another or have different length or arranged to represent an inclined side, the overall magnetic pole face 45 of the stator assembly 4 may form unequal flux and have an uneven induction with the perma- nent magnet of the rotor. Thus, the rotor can be started easily. Accordingly, when the permanent ring magnet of the rotor has an induction with the stator, the rotor can be started and thus turn easily.

According to the above description, a stator assemlby in accordance with the present invention of an axial winding type comprises an upper pole plate assembly consisting of a plurality of upper pole plates, a lower pole plate assembly consisting of a plurality of lower pole plates, and a bobbin. A larger path of magnetic conduction is provided between the upper and lower pole plate assemblies and the bobbin. In addition, the area of the magnetic pole faces of the upper and lower pole plate assemblies is increased to provide the rotor with a larger rotational torque. Furthermore, the magnetic pole faces of the upper and lower pole plate assemblies can be overlapped with each other or of the same or different length or arranged to represent an inclined side, the overall magnetic pole faces of the upper and lower pole plate assemblies form unequal flux and have uneven induction with the permanent magnet of the rotor. Thus, the rotor can be started easily. Accordingly, when the permanent ring magnet of the rotor has an induction with the stator, the rotor can be started and thus turn easily.

A stator assembly in accordance with the present invention of a radial winding type comprises a plurality of stacked silicon steel sheets. The overall area of the magnetic pole faces may remain unchanged or even increased even if the number of the silicon steel sheets is reduced. Thus, the stator and the permanent magnet of the rotor have a larger induction area therebetween, thereby providing the rotor with a larger rotational torque. Furthermore, the magnetic pole faces of each silicon steel sheet can be overlapped with each other or of the same or different length or arranged to represent an inclined side, the overall magnetic pole faces of the stator form unequal flux and have uneven induction with the permanent magnet of the rotor. Thus, the rotor can be started easily. Accordingly, when the permanent ring magnet of the rotor has an induction with the stator, the rotor can be started and thus turn easily.

Although the invention has been explained in relation to its preferred embodiment as mentioned above, it is to be understood that many other possible modifications and variations can be made without departing from the scope of the invention. It is, therefore, contemplated that the appended claims will cover such modifications and variations that fall within the true scope of the invention.

What is claimed is:

1. A stator assembly for a motor, the stator assembly comprising at least two stacked silicon steel sheets, each said silicon steel sheet including a plurality of radial poles each having a winding wound therearound, each said radial pole further including a distal end, a magnetic pole face projecting from the distal end of each said radial pole and vertically extending along a direction parallel to a longitudinal direction of the silicon steel sheet, the magnetic pole faces of the radial poles of the silicon steel sheets forming an overall magnetic pole face of the stator assembly.

2. The stator assembly for a motor as claimed in claim 1, wherein said magnetic pole faces on each said silicon steel sheet are overlapped with each other.

3. The stator assembly for a motor as claimed in claim 1, wherein said magnetic pole faces on each said silicon steel sheet are not overlapped with each other.

4. The stator assembly for a motor as claimed in claim 1, wherein said magnetic pole faces on each said silicon steel sheet are of the same length.

5. The stator assembly for a motor as claimed in claim 1, wherein said magnetic pole faces on each said silicon steel sheet are not of the same length.

6. The stator assembly for a motor as claimed in claim 1, wherein said magnetic pole faces on each said silicon steel sheet are not overlapped with each other and arranged side by side to represent an inclined side.

7. The stator assembly for a motor as claimed in claim 1, wherein each said magnetic pole face on each said silicon steel sheet has a width smaller than an associated said radial pole.

\* \* \* \* \*